US012265214B2

(12) United States Patent
Ravizza

(10) Patent No.: US 12,265,214 B2
(45) Date of Patent: Apr. 1, 2025

(54) METHOD OF MANUFACTURING MONOLITHIC OPTICAL SYSTEMS

(71) Applicant: Lawrence Livermore National Security, LLC, Livermore, CA (US)

(72) Inventor: Frank Ravizza, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 484 days.

(21) Appl. No.: 17/565,314

(22) Filed: Dec. 29, 2021

(65) Prior Publication Data

US 2023/0204936 A1 Jun. 29, 2023

(51) Int. Cl.
*G02B 23/02* (2006.01)
*B29D 11/00* (2006.01)
*C01B 33/158* (2006.01)
*C01B 33/16* (2006.01)
*G02B 7/18* (2021.01)
*G02B 7/182* (2021.01)
*G02B 7/183* (2021.01)
(Continued)

(52) U.S. Cl.
CPC ........ *G02B 23/02* (2013.01); *B29D 11/00596* (2013.01); *B29D 11/00865* (2013.01); *C01B 33/1585* (2013.01); *C01B 33/16* (2013.01); *C01B 33/163* (2013.01); *G02B 7/181* (2013.01); *G02B 7/182* (2013.01); *G02B 7/183* (2013.01); *G02B 17/0808* (2013.01); *B29K 2105/0061* (2013.01); *C08J 2205/026* (2013.01)

(58) Field of Classification Search
CPC .... C01B 33/1585; C01B 33/16; C01B 33/163
See application file for complete search history.

(56) References Cited

U.S. PATENT DOCUMENTS 5,221,364 A * 6/1993 Hotaling ................. H01L 31/18
136/246
5,260,962 A * 11/1993 Hotaling .............. G01C 19/668
356/471

(Continued)

OTHER PUBLICATIONS

Hotaling, S. P., and Rome Lab Rome NY. "Ultra-Low Density Aerogel Mirror Substrates." (Apr. 1993). (Year: 1993).*

(Continued)

*Primary Examiner* — Benjamin A Schiffman
(74) *Attorney, Agent, or Firm* — Perkins Coie LLP

(57) ABSTRACT

Disclosed are monolithic optical systems using an aerogel molded around a mandrel. A method of manufacturing an optical system includes applying a reflective coating to at least a portion of a surface of a mandrel, placing the mandrel in a tank and subsequently filling the tank with aerogel to a predetermined depth below a top of the mandrel. The method includes adding a separation layer to the tank on top of the aerogel at the predetermined depth, catalyzing the separation layer into a solid, and adding aerogel on top of the separation layer filling the tank with aerogel above a height of the mandrel, and removing the aerogel and mandrel from the tank, drying the aerogel into a solid aerogel structure, catalyzing the reflective coating to bond the reflective coating with the aerogel, and removing the mandrel from the aerogel structure to produce the aerogel structure having a hollowed-out interior.

17 Claims, 22 Drawing Sheets

(51) Int. Cl.
   *G02B 17/08* (2006.01)
   *B29K 105/00* (2006.01)

(56) References Cited

U.S. PATENT DOCUMENTS

| | | | | |
|---|---|---|---|---|
| 5,308,533 | A * | 5/1994 | Hotaling | F24F 8/108 252/181.1 |
| 5,358,776 | A * | 10/1994 | Hotaling | C03C 17/3417 428/307.3 |
| 5,360,572 | A * | 11/1994 | Hotaling | F24F 8/108 252/181.1 |
| 5,948,535 | A * | 9/1999 | Chiurlo | C03C 1/006 428/688 |
| 6,493,878 | B1 * | 12/2002 | Kassatly | H04N 9/8042 375/E7.268 |
| 8,256,910 | B2 * | 9/2012 | Odhner | G02B 5/09 359/839 |
| 8,461,529 | B2 * | 6/2013 | Hunter | G02B 26/02 250/330 |
| 8,511,842 | B1 * | 8/2013 | Sacco | G02B 26/0825 359/846 |
| 9,327,460 | B2 * | 5/2016 | Biver | G02C 7/101 |
| 9,995,507 | B2 * | 6/2018 | Norman | F24S 25/16 |
| 11,803,001 | B1 * | 10/2023 | Essinger-Hileman | G02B 5/0294 |
| 12,099,217 | B2 * | 9/2024 | Pomerantz | G02B 26/0833 |
| 2004/0056376 | A1 * | 3/2004 | Coronado | C01B 33/163 423/338 |
| 2023/0288692 | A1 * | 9/2023 | Ravizza | G02B 23/06 |
| 2024/0094541 | A1 * | 3/2024 | Voll | G02B 27/0172 |
| 2024/0160003 | A1 * | 5/2024 | Ravizza | G02B 23/02 |

OTHER PUBLICATIONS

Hrubesh, Lawrence W. "Aerogel applications." Journal of Non-Crystalline Solids 225 (Nov. 19, 1998): 335-342. (Year: 1998).*

Kharzheev, Yu N. "Use of silica aerogels in Cherenkov counters." Physics of particles and nuclei 39 (Jan. 2008): 107-135. (Year: 2008).*

Barnyakov, A. Yu, et al. "Impact of polishing on the light scattering at aerogel surface." Nuclear Instruments and Methods in Physics Research Section A: Accelerators, Spectrometers, Detectors and Associated Equipment 824 (Nov. 29, 2015): 123-124. (Year: 2015).*

Pereira Ferrazzi, Bruno. A study of mirrors for an Aerogel Ring Imaging Cherenkov detector. Diss. Faculty of Graduate Studies and Research, University of Regina, Aug. 2022. (Year: 2022).*

\* cited by examiner

METHOD OF MANUFACTURING MONOLITHIC OPTICAL SYSTEMS

FEDERALLY SPONSORED RESEARCH OR DEVELOPMENT

This invention was made with Government support under Contract No. DE-AC52-07NA27344 awarded by the United States Department of Energy. The Government has certain rights in the invention.

TECHNICAL FIELD

The present disclosure relates to light-weight monolithic optics.

BACKGROUND

Many optical systems can benefit from light-weight components that are not susceptible to alignment changes after being manufactured. For example, telescopes are important parts of many space-based systems that require an alignment that is maintained over their lifetime. Because space-based systems are launched from earth via rocket with limited payload capacity, the weight of spaced-based optics is very important. Moreover, the stability of the alignment of optical systems is critical to the proper functioning of the optical systems which must survive and maintain alignment under the severe forces of rocket launch. These characteristics are also desirable for many non-space-based applications and systems that range from cameras, to optical testing and measurement equipment, and to a variety of imaging systems. Therefore, new techniques for making light-weight, rigid, and stable optical systems are needed.

SUMMARY

Disclosed are monolithic optical systems and methods of making said systems using an aerogel molded around a master mandrel. This approach produces high stability optics free from alignment changes over time in an ultralow density aerogel. Using this approach, the monolith is hollow with an aerogel substrate providing a supporting structure.

In one aspect, a method of manufacturing an optical system is disclosed. The method includes applying a reflective coating to at least a portion of a surface of a mandrel, placing the mandrel in a tank and subsequently filling the tank with aerogel to a predetermined depth below a top of the mandrel. The method further includes adding a separation layer to the tank on top of the aerogel at the predetermined depth, and catalyzing the separation layer into a solid, and adding aerogel on top of the separation layer filling the tank with aerogel above a height of the mandrel. The method includes removing the aerogel and mandrel from the tank, drying the aerogel into a solid aerogel structure, and catalyzing the reflective coating to bond the reflective coating with the aerogel. The method further includes removing the mandrel from the aerogel structure to produce the aerogel structure having a hollowed-out interior.

The following features can be included in various combinations. The removing the mandrel includes separating a top portion of the aerogel structure from a bottom portion of the aerogel structure, and bonding together the top portion of the aerogel structure to the bottom portion of the aerogel structure after the mandrel has been removed. The method includes applying a lifting layer before applying the reflective coating. The method includes applying an aerogel bonding layer to the reflective coating after applying the reflective coating and before submerging the mandrel. The method includes cutting holes in one or both of a top portion or a bottom portion of the aerogel structure to provide an unobstructed path for light to reach into or exit the optical system. The method includes providing a protective structure abound one or both of the bonded top or bottom portions. The method includes etching the separation layer using an etchant. The etchant is aqua regia. The reflective coating is applied to two or more surfaces of the mandrel. The separation layer floats on top of the aerogel. The drying the aerogel is supercritically drying the aerogel. The bonding layer is cured by heating the aerogel and reflective coating. The tank includes a support structure to mechanically support the mandrel in the tank. The aerogel is tetraethyl orthosilicate. The aerogel is a silica aerogel. The reflective coating is applied to two surfaces of the mandrel to produce two mirrors in the aerogel structure. The reflective coating is applied to one surface of the mandrel to produce one mirror in the aerogel structure.

In another aspect, an optical apparatus is disclosed. The apparatus includes a first mirror comprising a first reflective coating applied to a dried aerogel, and a second mirror comprising a second reflective coating applied to the dried aerogel, wherein the first mirror and the second mirror are arranged to have a fixed alignment with respect to each other as part of a monolithic structure. The apparatus further includes three or more spider support arms comprising dried aerogel attached to the one of the first or the second mirror, the three or more spider support arms structured to mechanically support the one of the first or the second mirror.

The following features can be included in various combinations. The optical apparatus is a Cassegrain telescope and first and the second mirrors are a primary mirror and a secondary mirror, respectively, of the Cassegrain telescope. The aerogel is silica aerogel. The dried aerogel is supercritically dried silica aerogel. The first and second reflective coatings comprise silver. The apparatus includes a protective structure positioned on at least a part of the dried aerogel associated with the first or the second mirror. The apparatus includes one or more lenses.

DETAILED DESCRIPTION

Figure 1:
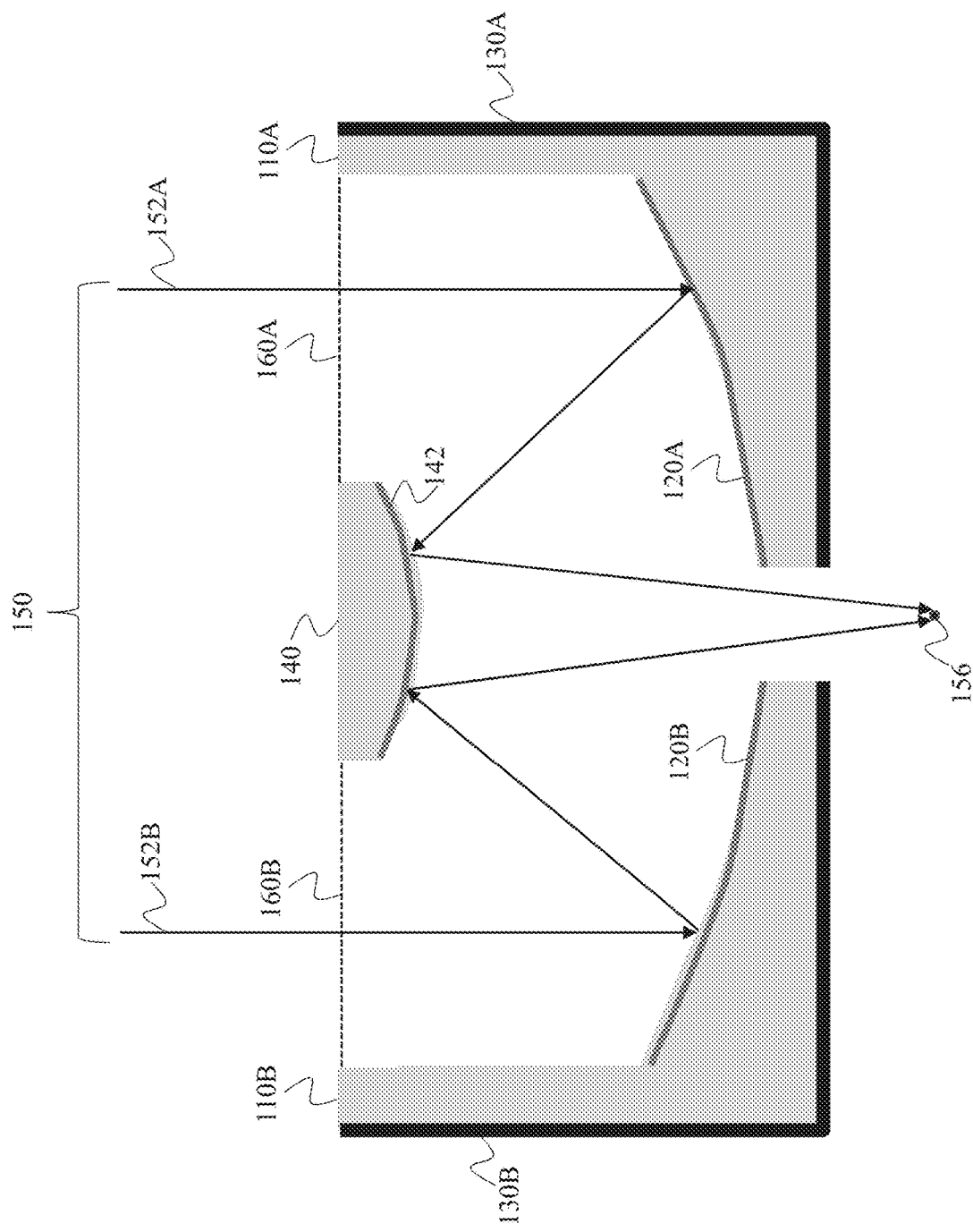
FIG. 1 shows an optical system, in accordance with some example embodiments.

Disclosed are monolithic optical systems using aerogel fabricated by molding around a master mandrel. This approach combines the stability of monolithic telescopes with the ultralow density of silica aerogels. Using this approach, the monolith is hollow with an aerogel substrate providing a supporting structure. For example, a 1-meter aperture space-based telescope with a mass as low as 15 kilograms (kg) can be produced, and this mass can scale as the aperture diameter cubed.

To further illustrate the features of the disclosed embodiments, telescopes and space-based optical systems are used throughout this patent document as examples to facilitate the understanding of the disclosed technology. However, applications for the disclosed techniques span beyond space-based telescopes, ground-based telescopes, or astronomy equipment, and include intelligence, reconnaissance, and surveillance (ISR) equipment, beam directors for lasers, consumer imaging devices, and other applications where light-weight optics are desirable.

Monolithic telescopes generally refer to reflective telescopes fabricated using a single silica substrate. This approach provides exceptional mechanical stability because the relative position of the mirrors is permanently polished into the monolithic substrate and are inherently temperature insensitive due to the low coefficient of thermal expansion (CTE) of fused silica (0.5 ppm/K). Once fabricated, monolithic telescopes are mechanically robust and reliable because the mirrors will always be aligned, even after subject to extreme force like during a launch into space.

Up to apertures less than 1 meter, the stability of the monolithic approach more than offsets any additional mass imposed by its large substrate. However, as apertures approach 1 meter in diameter, the monolith mass could exceed 1000 kg. For apertures on the order of a meter in size or larger, light-weight materials such as silicon carbide may be preferred for Cassegrain telescopes using separate mirror substrates. In some traditional monolithic telescopes, light rays must transmit through the substrate where color dispersion and light absorption degrades image quality and limits spectral bandwidth.

The disclosed subject matter improves on the prior systems at least in-part by effectively hollowing-out the volume between the mirrors and filling the hallowed-out volume with air (or vacuum) to reduce the mass and eliminate dispersion and absorption. In some example embodiments, silica aerogel optics is formed around a mandrel or a master monolithicoptic.

Aerogels are an ultra-low density solid material. In some embodiments of the disclosed subject matter, the aerogel density is about 0.1 g/cm$^3$. The aerogel can be formed in a highly porous matrix. For example, fused silica has a density is 2.2 g/cm$^3$. Then, a silica aerogel with aerogel density of 0.1 g/cm$^3$ has a porosity of $(1-[0.1/2.2])\times 100\%=99.5\%$ void. Fabricating optics from aerogels is possible for both refractive and reflective system. The utility of refractive optics is limited by scattering losses as light passes through the porous silica matrix, and the small index of refraction of aerogels limits their usefulness as refractive elements. Reflective optical systems are also possible whereby mirror surfaces are included in the aerogel substrate during the fabrication process. The porosity and brittle nature of aerogel substrates pose challenges including the tendency for rough surface texture which can result in mirrored surfaces with significant scattering.

Unlike prior approaches, the disclosed techniques additively build a supporting aerogel structure using a monolith optical system (e.g., a monolith telescope) as a mandrel to shape the aerogel. Once the aerogel structure forms dries, the master mandrel can be non-destructively removed from the aerogel structure for subsequent reuse in a production molding process. This process is repeatable and enables low-cost, volume production of high-performance optical systems with apertures of 1 meter or larger. The same techniques can also be used for smaller than 1-meter apertures.

In some example embodiments, an aerogel mirror includes a monolithic aerogel mirror substrate that is formed in an aerogel material. The mirror substrate has a reflective surface added to the substrate during the aerogel mirror processing. The substrate can include more than one mirror and form an optical system.

The shape of an aerogel mirror can conform to a mandrel or a master optic using a fabrication process such as a molding process. In the process, the molded aerogel substrate can be removed by a chemical process, a cutting tool, or a laser to accomplish separation of the mandrel from the aerogel structure. The mandrel can be non-destructively separated from the aerogel mirror substrate and be reused in a volume manufacturing process such as in a molding production process. In embodiments where the aerogel structure is separated along predetermined surfaces to remove the mandrel, the separated structures can be recombined and bonded back together into a monolithic substrate with the same internal dimensions as the mandrel used as the mold during the fabrication process.

An optically reflective coating applied to the mandrel can be transferred from the mandrel to the aerogel mirror substrate to produce mirror surfaces. A lifting process can be used to non-destructively remove the mirror from mirror substrate using a chemical process or other method. A metallic or nonmetallic coating, such as a silver mirror coated over a gold lifting layer can be fabricated where the sliver layer is lifted using aqua regia or other selective etch process to non-destructively separate mirror layers.

The separated mirror layer can then be incorporated into the aerogel substrate sharing the same dimensional tolerances as the master mirror mandrel. The lifting process may be combined with resist and etch layers to accomplish non-destructive mandrel separation and reflective mirror layer incorporation into the aerogel mirror substrate according to the process.

Mirror surfaces formed in aerogel may be refigured by any number of optical figuring and polishing technique. A new mirror coating may be added to a bare aerogel substrate or overcoated atop a lifted layer from the mandrel substrate. A protective outer coating and/or a superstructure or frame can improve the mechanical durability of the fabricated aerogel.

Mechanical mounting features can be incorporated into the aerogel mirror substrate to accomplish mounting of the aerogel mirror substrate into an optical system which may include an image sensor, refocusing mechanism, and/or other apparatus to produce an imaging device or other optical device. The assembled aerogel mirror system is suitable for various optical applications including consumer devices, space telescopes, and devices where reflective mirrors are suitable, including a beam director for a free-space optical communication transceiver node.

In some example embodiments, an optical system formed in an aerogel material. The shapes of various components of the optical system can be formed using a master substrate, or a mandrel. These formed components can include one or more reflective or refractive surfaces as well as supporting mechanical structures in the aerogel material. The dimensions of the various components match the dimensions of the mandrel and have a surface figure and surface polish quality that matches the mandrel surface with or without additional processing. The fabricated aerogel structure can be non-destructively separated from the forming mandrel, and reversibly reassembled to match the dimensions of the mandrel. Surface coatings and further processing can be applied to the optical surfaces to additionally modify or improve the surface reflectivity or transmissibility.

FIG. 1 depicts an example of a Cassegrain telescope made using the disclosed methodology. As shown in FIG. 1, input light including light rays 152A and 152B enter the telescope 100 and are reflected by primary mirror surfaces 120A and 120B, respectively, toward the secondary mirror surface 142 of secondary mirror 140. Secondary mirror 140 focuses the incoming light to focal point 156. Primary mirror surfaces 120A/120B and secondary mirror surface 142 include a reflective coating on aerogel 110A/110B/140. The reflective coating is instantiated onto the aerogel during the fabrication process as detailed in this patent document. The shape of the aerogel substrates 120A/120B/140 are defined by a mandrel used in the fabrication process and was subsequently removed. Protective structures 130A/130B protect and strengthen the aerogel substrates 110A/110B/140. The Cassegrain telescope of FIG. 1 is an example of an optical system that can be fabricated using the disclosed techniques. Other optical components and systems can be made using the same techniques.

FIGS. 2-21 depict steps in an example process for fabricating a Cassegrain telescope as an example of an optical system that can be fabricated using the disclosed techniques.

Figure 2:
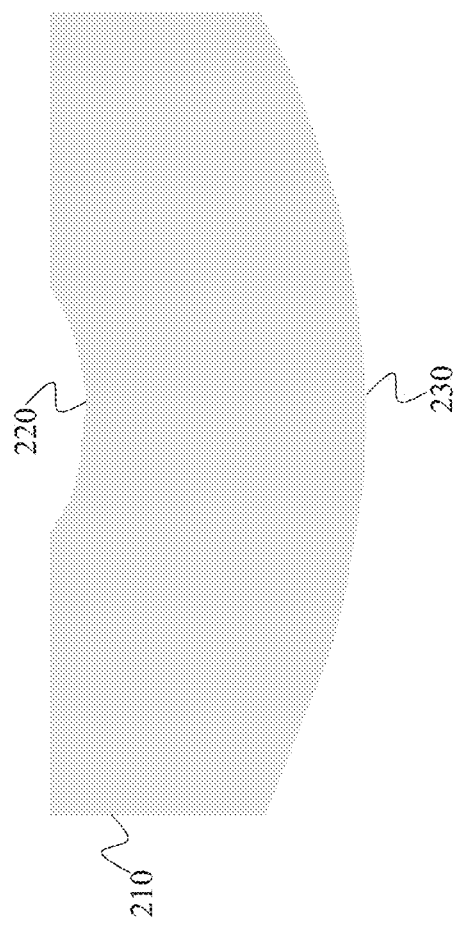
FIG. 2 shows an example of a mandrel having first and second surfaces used to mold an aerogel to produce s primary mirror and s secondary mirrors of a Cassegrain telescope.

FIG. 2 shows an example of a mandrel 210 (also referred to as a monolithic substrate) having a first surface 230 to be molded using an aerogel to produce the primary mirror surface of a Cassegrain telescope. Mandrel 210 also has a second surface 220 to be molded using the aerogel to produce the secondary mirror surface of the Cassegrain telescope. Mandrel may be made from fused silica or other rigid material.

Figure 3:
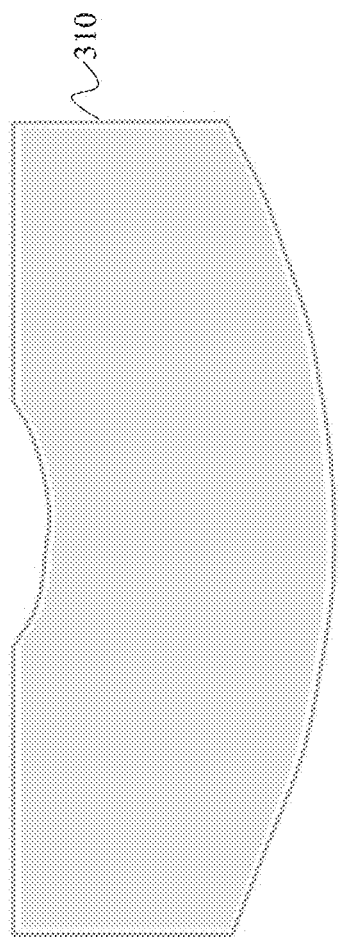
FIG. 3 shows a separation layer applied to the mandrel, in accordance with some example embodiments.

FIG. 3 shows a separation layer 310 applied to the mandrel. For example, a gold (Au) layer deposited onto the mandrel can serve as the separation layer. Other materials can be used as the separation layer instead of gold. The separation layer may cover all surfaces of the mandrel. The separation layer can be applied to the mandrel using techniques such as sputtering, chemical vapor deposition, or other techniques such as, for example, a thermal process where the separation layer is applied by melting using electrical heaters or in an oven.

Figure 4:
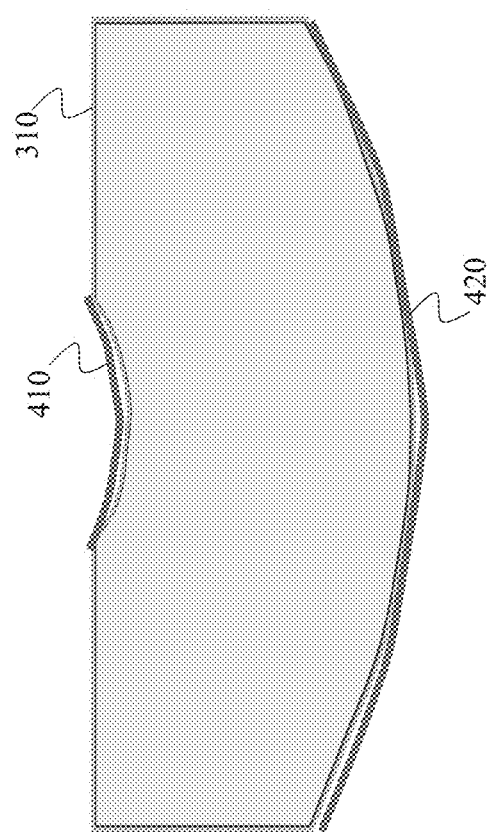
FIG. 4 shows a first and second mirror coating layers applied over a separation layer, in accordance with some example embodiments.

FIG. 4 shows a first mirror coating layer 410 applied over the separation layer 310 and a second mirror coating layer 420 applied over the separation layer 310. For example, a sliver layer deposited over the separation layer (and mandrel) can serve as the mirror coating layers 410 and 420. The mirror coating layer can be a metal or a dielectric. Metal mirrors are typically a monolayer with an overcoat of a material such as silica to mitigate oxidation of the metal (e.g., silver). Dielectric coatings may include two or more materials as bilayers that are different in index of refraction. Different portions of the device may have different mirror coating layers such as some area having a metal coating and another area dielectric coatings. The mirror coating layers 410 and 420 may cover surfaces of the mandrel that will become reflective surfaces in the completed device. The mirror coating layers 410 and 420 can be applied to the mandrel using techniques such as sputtering, chemical vapor deposition, or other techniques such as electron beam physical vapor deposition or atomic layer deposition. Other techniques may be used from micro-electronic fabrication processes.

Figure 5:
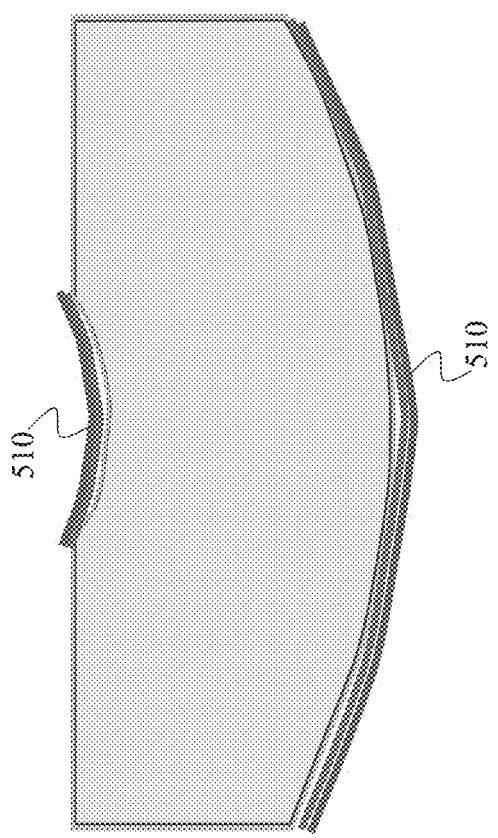
FIG. 5 shows an aerogel bonding layer applied over the mirror coating layer, in accordance with some example embodiments.

FIG. 5 shows an aerogel bonding layer 510 applied over the mirror coating layer 410. The bonding layer 510 may cover surfaces of the mandrel that will become reflective surfaces in the completed device. The bonding layer 510 can be applied to the mandrel using the same or similar techniques and processes as detailed above for the optical mirror coating layers. In the areas where the bonding layer 510 is applied, the mirror coating layer will bond to the aerogel.

Figure 6:
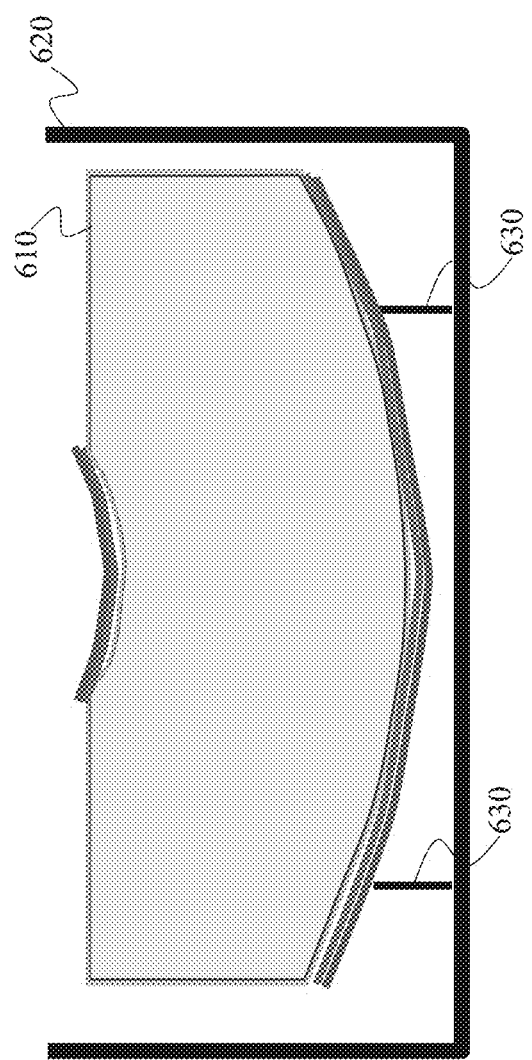
FIG. 6 shows an example of a mandrel processed from in accordance with FIGS. 2 to 5 that is placed in an aerogel tank.

FIG. 6 shows the mandrel 610 processed from FIGS. 1 to 5 that is placed in an aerogel tank 620. The bottom of the device 610 is held off the tank floor and stabilized by support structure 630.

Figure 7:
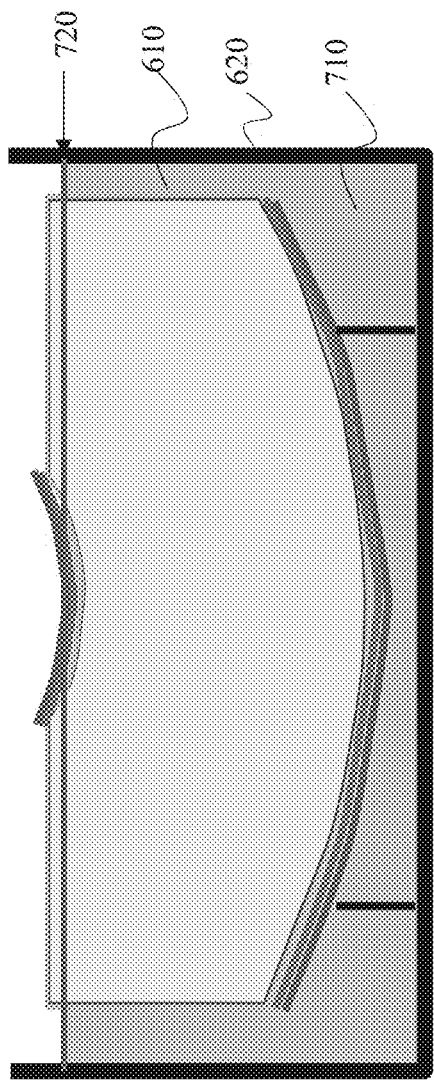
FIG. 7 shows a mandrel in an aerogel tank that has been filed with aerogel to a level that is below a top surface of a device, in accordance with some example embodiments.

FIG. 7 shows mandrel 610 in aerogel tank 620 that has been filed with aerogel 710 to level 720 which is below the top surface of device 610. For example, the aerogel tank 620 may be filled with tetraethyl orthosilicate (TEOS) or other liquid aerogel precursor. Depending on the aerogel material, different precursor materials can also be used. For example, a precursor for some silica aerogels may include liquid alcohol and a silicon alkoxide such as tetramethoxysilane (TMOS), tetraethoxysilane (TEOS) and polyethoxydisilane (PEDS), or sodium silicates.

Figure 8:
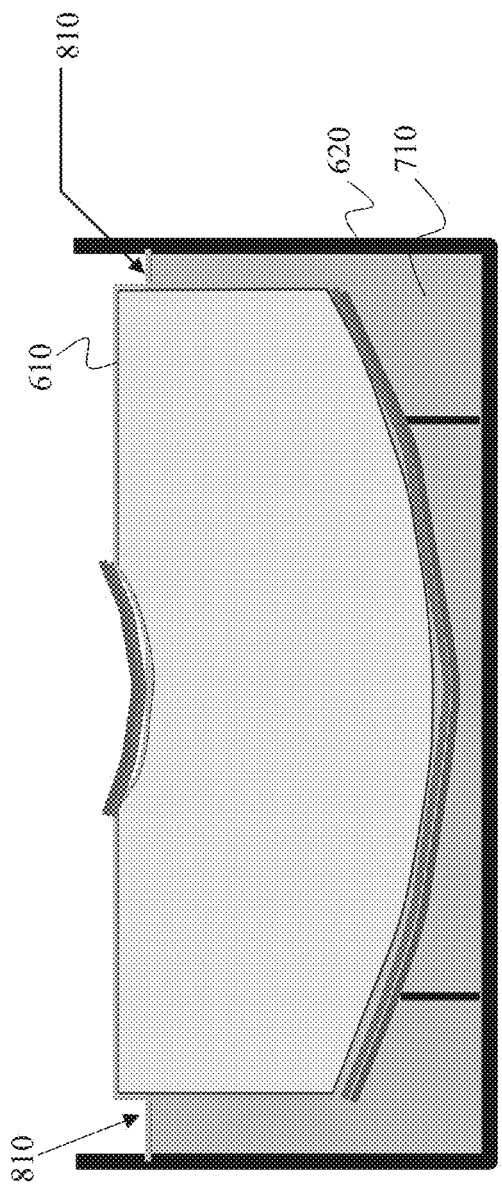
FIG. 8 shows a mandrel in an aerogel tank that has been filed with an aerogel with a floating separation layer, in accordance with some example embodiments.

FIG. 8 shows mandrel 610 in aerogel tank 620 that has been filed with aerogel 710 to level 720 with a floating separation layer 810. The floating separation layer 810 floats on top of the level of the aerogel 720 in FIG. 7. The floating separation layer 810 is then catalyzed into a solid. In some example embodiments, the separation layer 810 can be applied directly to the surface as a film. The floating separation layer can be an immiscible liquid which has a lower density than alcohol and does not dissolve in alcohol, or a thin film of a solid can be applied, one which crosslinks, is thin, and has sufficient strength. Either way, the separation layer 810 will later assist in removal of the mandrel from the aerogel substrate.

Figure 9:
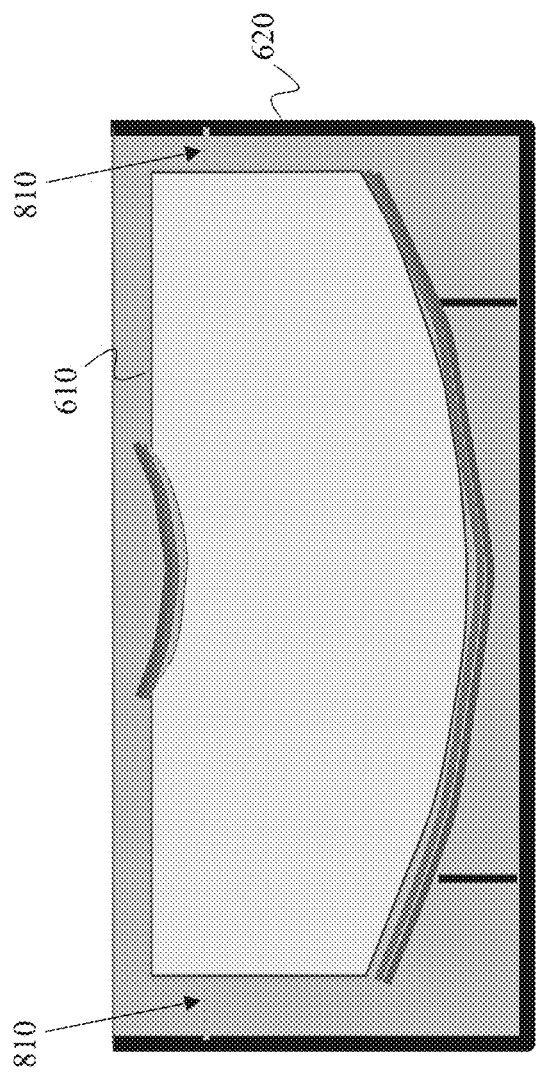
FIG. 9 shows a mandrel in an aerogel tank that has been filed with aerogel to a level below the separation layer and has been filed with aerogel on top of the separation layer to above the top surface of the device, in accordance with some example embodiments.

FIG. 9 shows mandrel 610 in aerogel tank 620 that has been filed with aerogel 710 to level 720 below the separation layer 810 and has been filed with aerogel on top of the separation layer 810 to above the top surface of the device 610.

Figure 10:
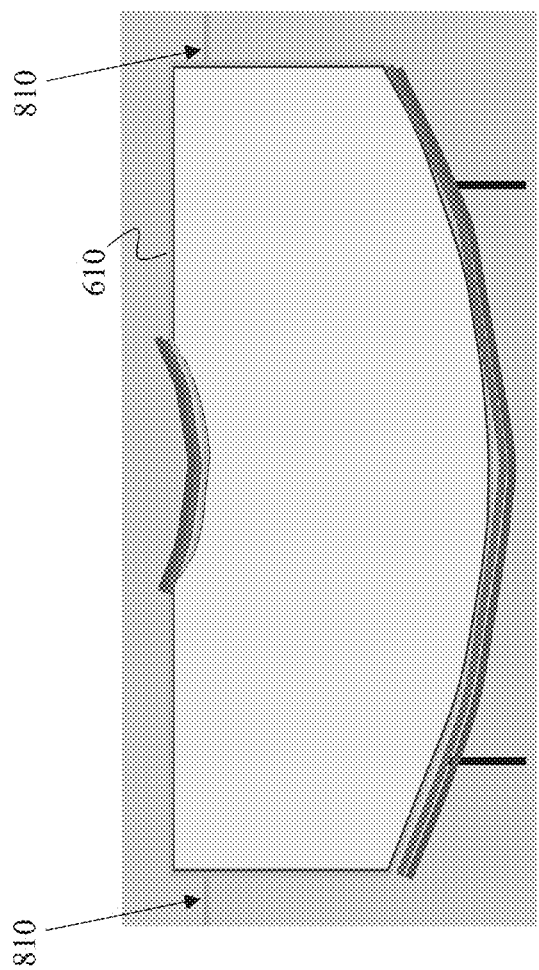
FIG. 10 shows a device with an aerogel at least partially cured below and above a separation layer that has been removed from the tank, in accordance with some example embodiments.

FIG. 10 shows device 610 with aerogel at least partially cured below and above the separation layer 810 that has been removed from the tank 620.

Figure 11:
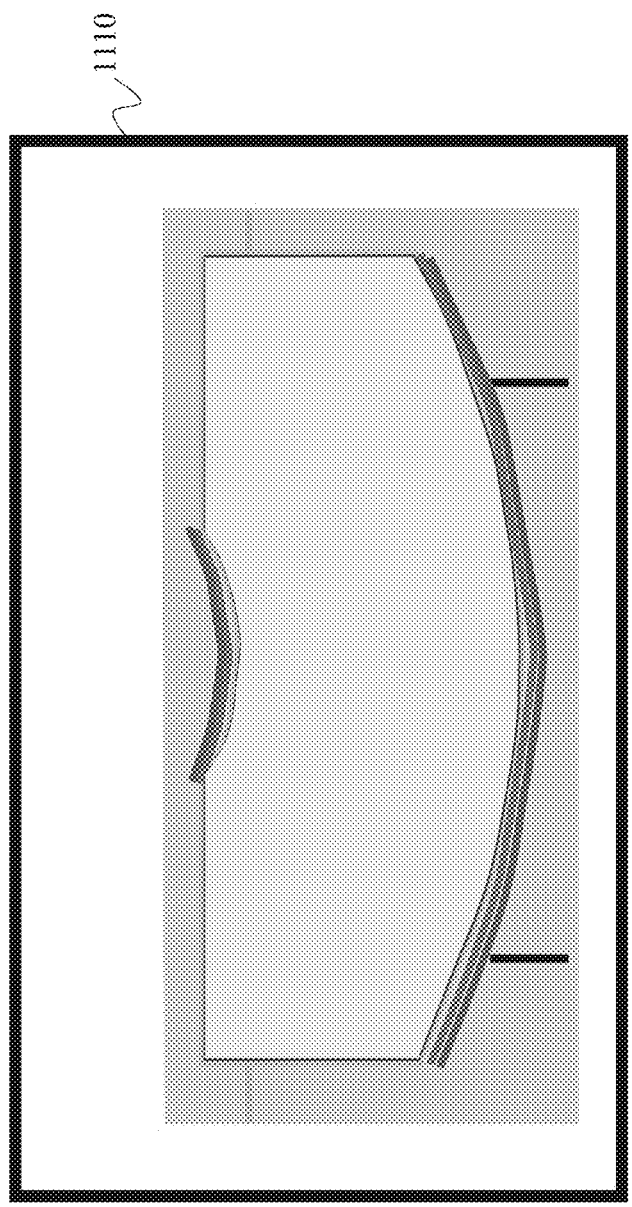
FIG. 11 shows the mandrel in partially cured aerogel that has been placed in a drying chamber to fully cure the aerogel, in accordance with some example embodiments.

FIG. 11 shows the mandrel in partially cured aerogel that has been placed in a drying chamber 1110 to fully dry the aerogel. "Supercritical" drying can be used to avoid "shrinkage" of the aerogel. This requires high temperature and high pressure. For example, a temperature of >250° C. and a pressure of >80 bar may be used. The time at high temperature and high pressure are parameters that should be controlled during the drying process. For example, the temperature and pressure can be raised approximately linearly over about 60 min, and held at the high temperature and high pressure for about 30 min, and then lowered to room temperature and pressure over >120 min. In some example embodiments, to reach high pressure, ocean depth can be used to passively generate the high pressure, (i.e. a submarine type fabrication tank).

Figure 12:
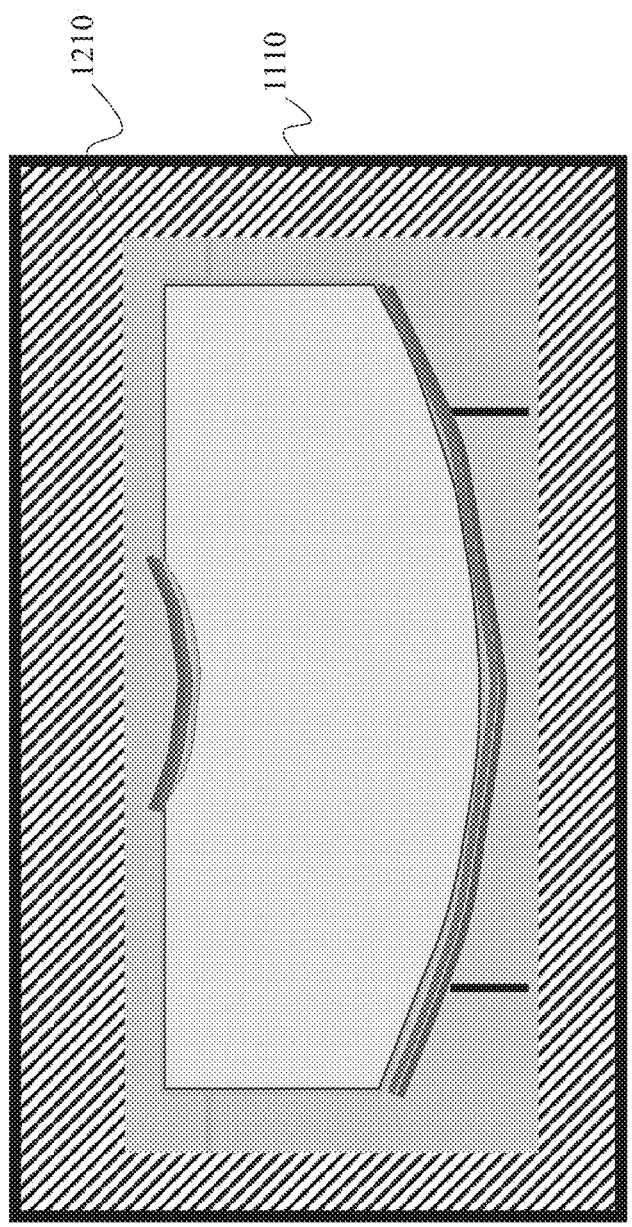
FIG. 12, shows an example diagram of the bonding layer catalyzed to bond the mirror coatings to the aerogel.

In FIG. 12, the bonding layer is catalyzed to bond the mirror coatings to the aerogel. The catalyzation can be performed by raising the temperature in the drying chamber 1110 to a high temperature such as 250° C. or another high temperature appropriate for the bonding layer.

Figure 13:
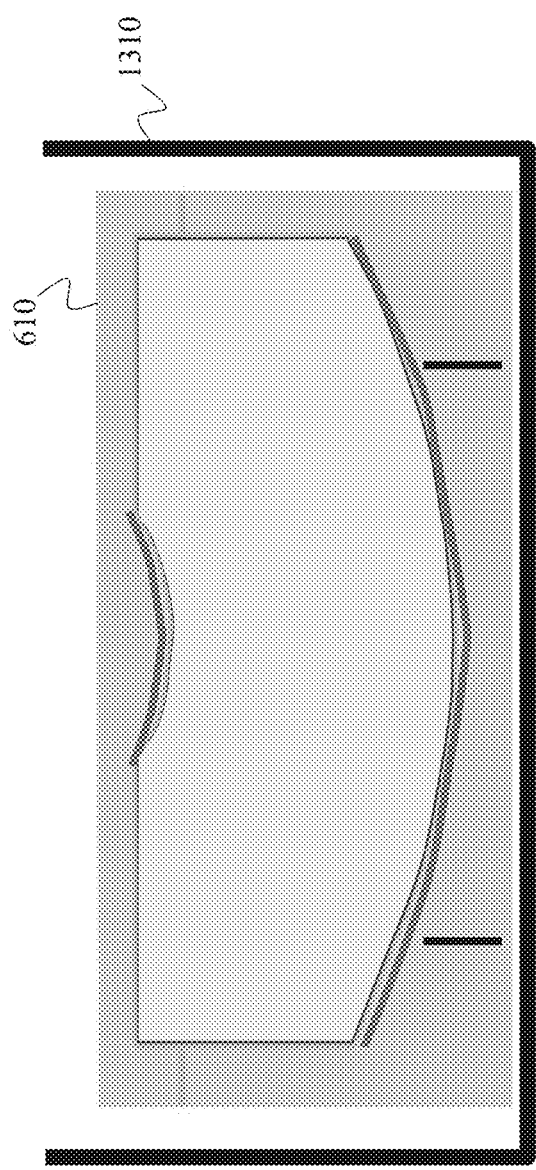
FIG. 13 shows an example diagram of the aerogel structure with bonded mirror coatings placed into a separation tank.
Figure 14:
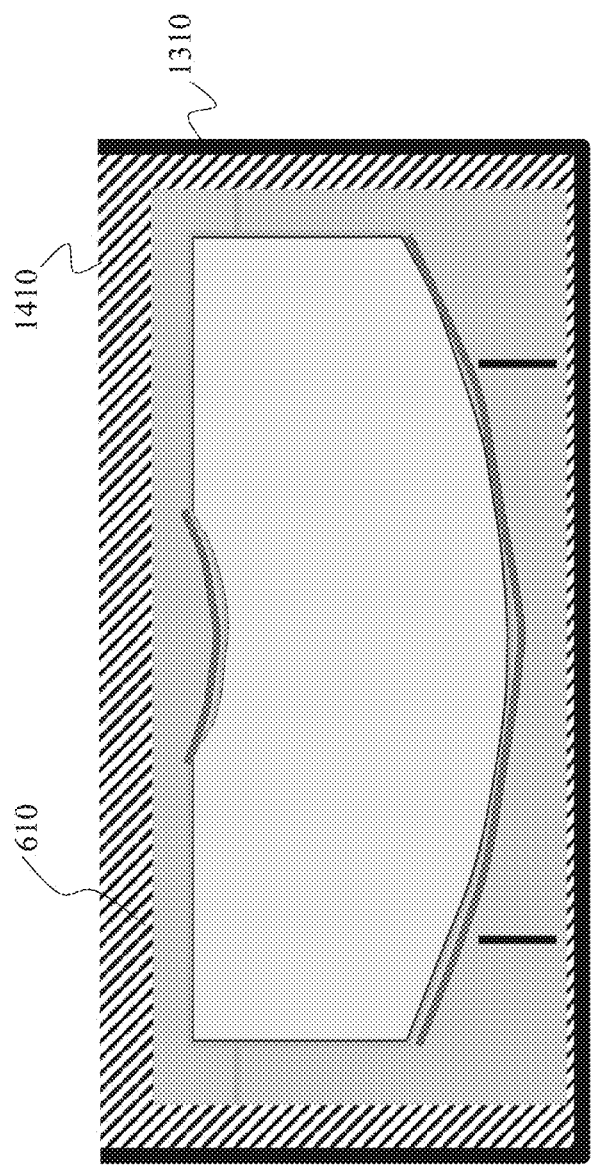
FIG. 14 shows an example of the separation tank filled with an etching solution.
Figure 15:
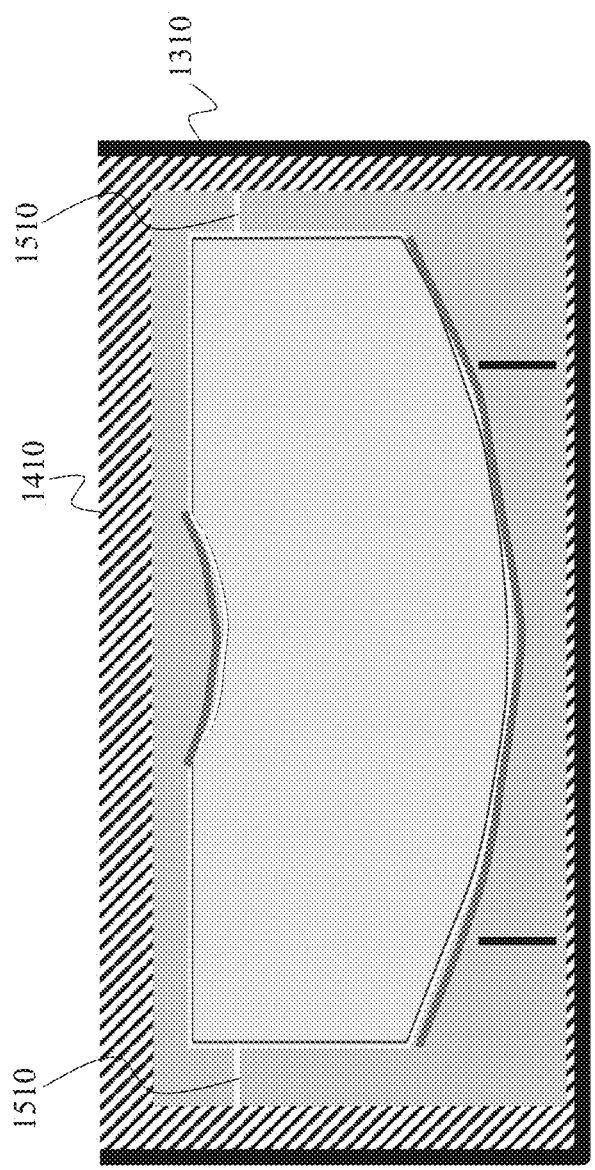
FIG. 15 shows an example of the etched away separation layer by the etching solution in a tank.
Figure 16:
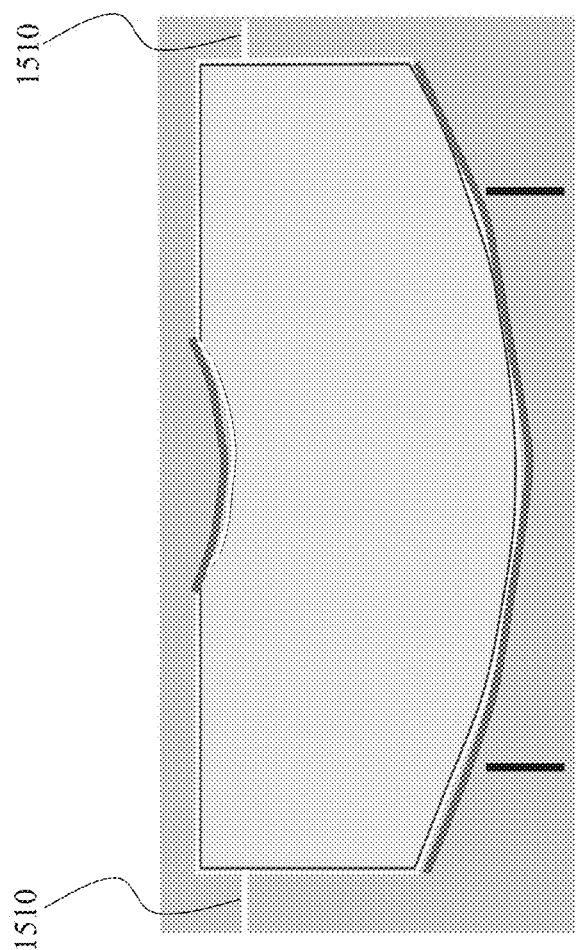
FIG. 16 shows an example of a cured aerogel structure with etched separation layer and mandrel that are removed from the separation tank, cleaned, and dried as needed.

In FIG. 13, the aerogel structure 610 with bonded mirror coatings is placed into a separation tank 1310. In FIG. 14, the separation tank 1310 is filled with an etching solution 1410 such as aqua regia. Other etching solutions can also be used such as etching solutions used in microelectronics or semiconductor fabrication. In FIG. 15, the etching solution 1410 has etched away the separation layer 810 in tank 1310 as shown at 1510. The separation layer being dissolved allows for two halves of the cured aerogel to be separated from the mandrel. In FIG. 16, the cured aerogel structure with etched separation layer 1510 and mandrel are removed from the separation tank, cleaned, and dried as needed.

Figure 17:
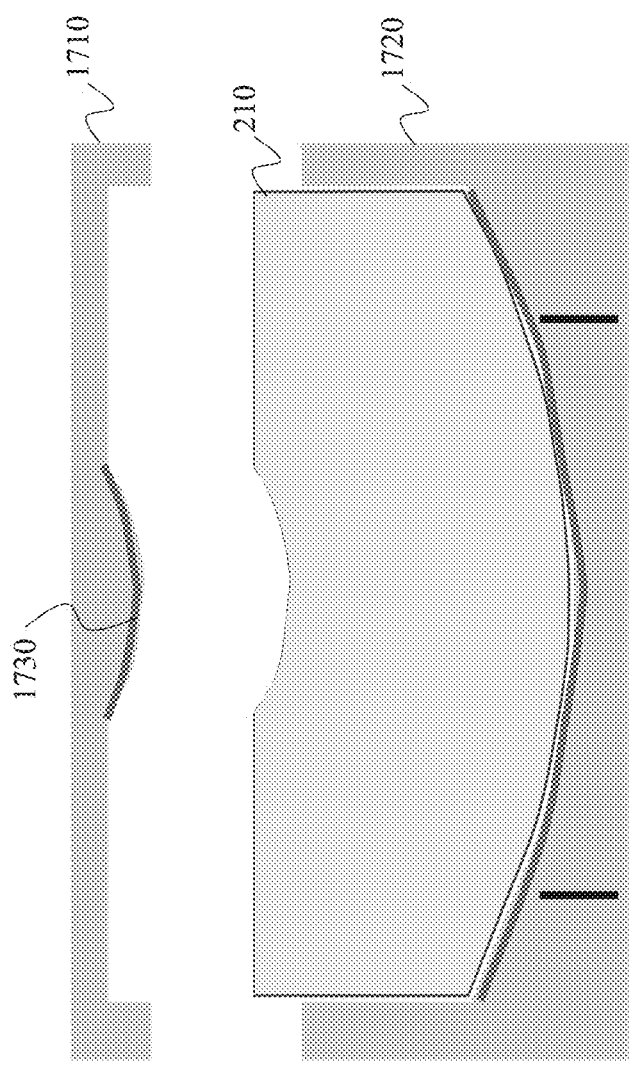
FIG. 17 shows an example of the top half of the aerogel structure separated from the mandrel and the bottom half of the aerogel structure.
Figure 18:
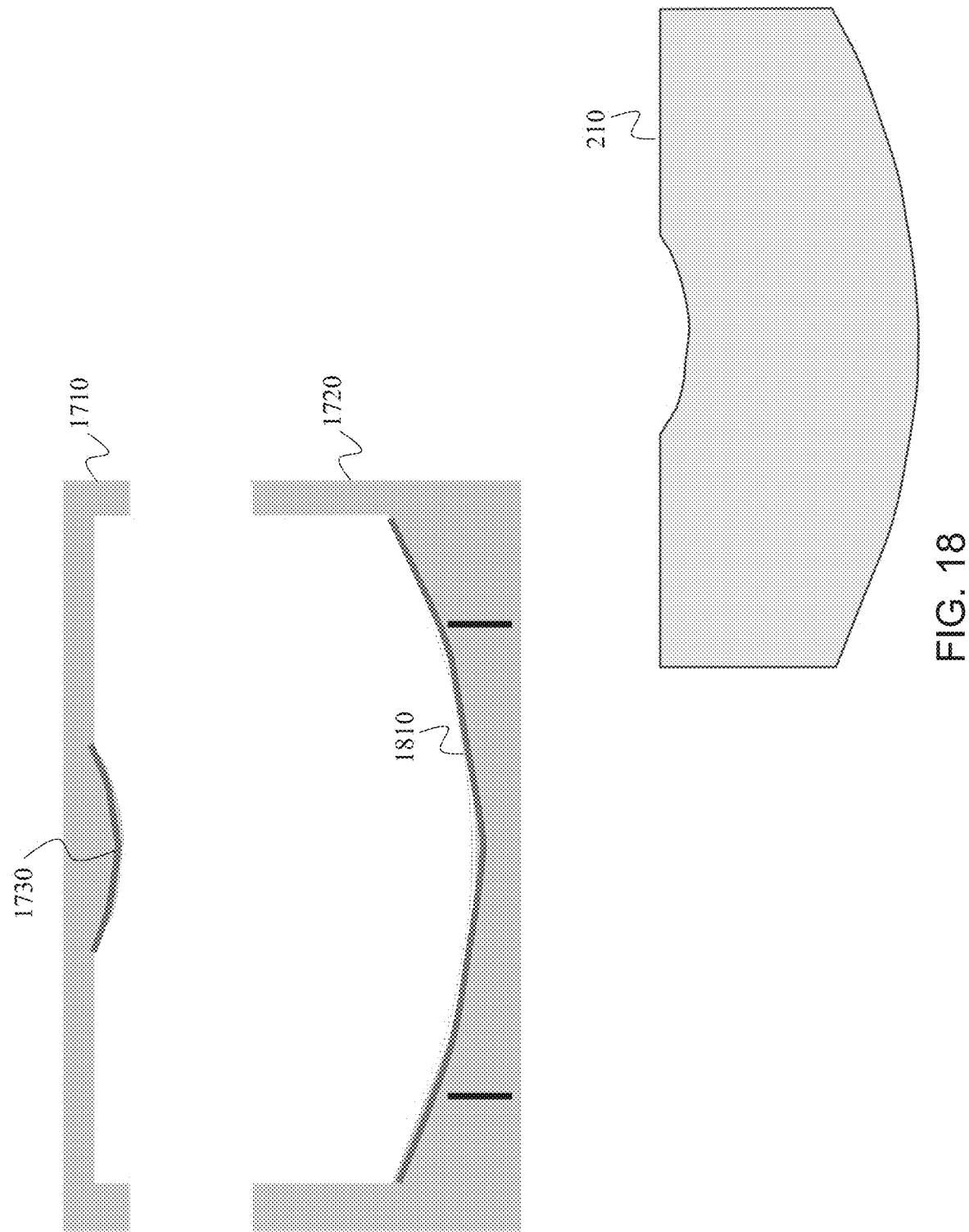
FIG. 18 shows an example of the reusable mandrel removed from cured aerogel halves including a top half and a bottom half.
Figure 19:
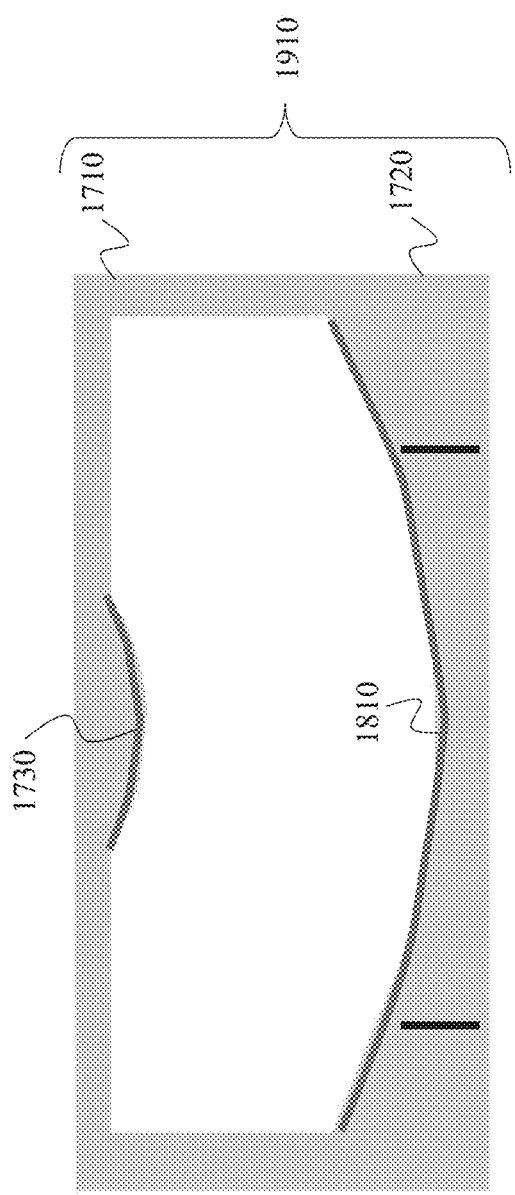
FIG. 19 shows an example of the two aerogel halves bonded back together to form a monolithic aerogel structure.

In FIG. 17, the top half of the aerogel structure 1710 is separated from the mandrel 210 and bottom half of the aerogel structure 1720. The top half 1710 includes mirror 1730. In FIG. 18, the mandrel 210 is removed from the cured aerogel halves 1710 and 1720. The bottom half 1720 includes mirror 1810 and the top half 1710 includes mirror 1730. The mandrel 210 is kept for reuse to make additional devices. In FIG. 19, the two aerogel halves 1710 and 1720 are bonded back together to form a monolithic aerogel structure 1910. Various bonding techniques can be used to bond the halves back together including using glue, a bonding agent, and/or heat. The bonded aerogel structure includes mirrors 1730 and 1810. More or fewer mirrors can be fabricated in an aerogel structure.

Figure 20:
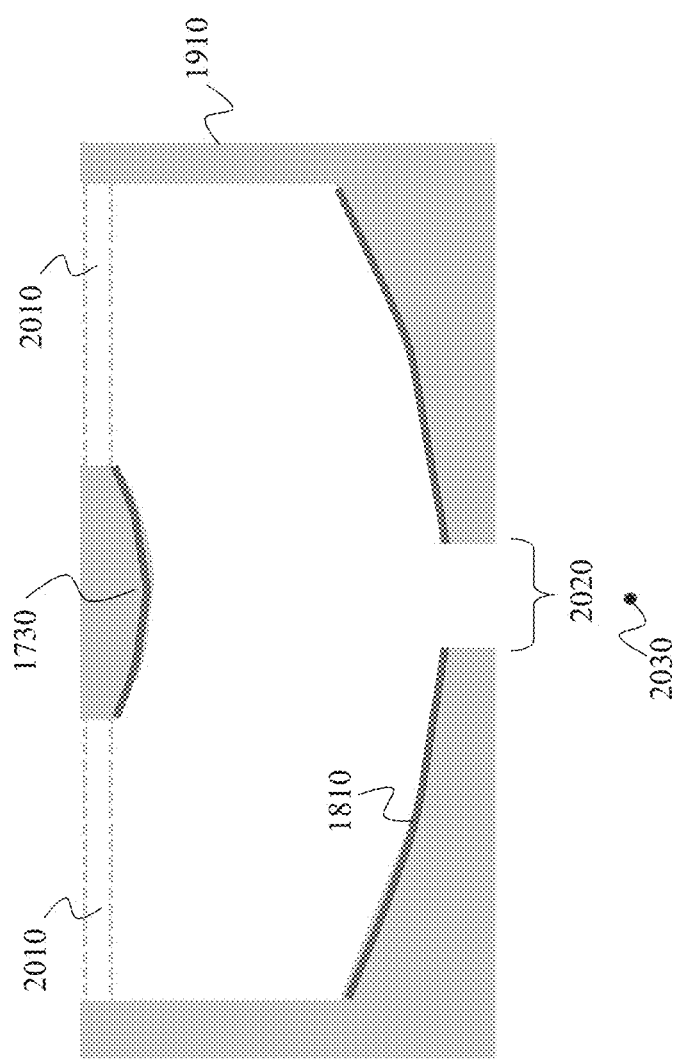
FIG. 20 shows holes cut or etched into the aerogel structure.

In FIG. 20, holes are cut or etched into the top half of the aerogel bonded together aerogel structure 1910. The aerogel material can be etched or removed to minimize obstruction to incoming light 150. In some example embodiments, all of the aerogel may be removed except for three or four "spider support arms" 2010 or the thinnest arms of aerogel needed to mechanically support the secondary mirror 1730. A hole 2020 can also be placed at the bottom of the aerogel structure 1910 to allow light to pass through the hole 2020 in mirror 1810 to a focal point 2030 needed for a Cassegrain telescope, or for further optical processing. The aerogel device 2000 in FIG. 20 is the finished aerogel optical system.

Figure 21:
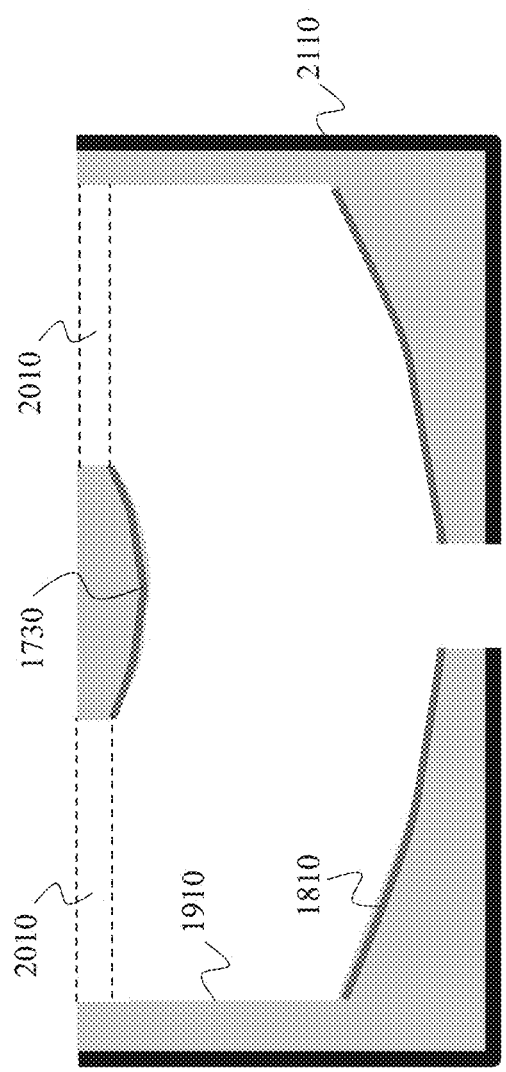
FIG. 21 shows an example of a finished monolithic structure with a protective structure to mechanically protect and support the monolithic.

FIG. 21 shows the finished monolithic structure with a protective structure 2110 to mechanically protect and support the monolithic structure. The finished monolithic structure includes mirrors 1730 and 1810, monolithic aerogel structure 1910, spider support arms 2010 and protective structure 2110. The configuration in FIG. 21 is light-weight due to the use of low-density material (aerogel) that is used to provide sufficient thickness for supporting the reflecting surfaces that form the first and second mirrors, while the remaining structure is hollowed out. Aside from its lowweight feature, the configuration in FIG. 21 eliminates (or greatly reduces) the need for aligning the two mirrors that is the hallmark of monolithic optical systems albeit without the extra bulk material.

FIGS. 2-21 show an example process for producing aerogel structures that can include two mirrors. In the example implementation shown, the process is applied to producing a Cassegrain telescope. Other optical systems can also be produced using the process detailed in FIGS. 2-21, which may have more than two mirrors. In such configuration, similar processes may be implemented to produce a mandril that is configured to accommodate more than two optical surfaces. The disclosed techniques can be applied to monolithic mirrors, as well as any other type of mirror based optical system (i.e., telescope or other optical system) and catadioptric systems which may combine one or more integrated refractive element (e.g., lenses or refractive correction plate). In some embodiments, the disclosed techniques may be used to similarly produce a single optical component (e.g., single reflective surface). Such configurations may be beneficial in, for example, applications where manufacturing of a large optical component with a low weight is desired. For the purposed of illustration and not by limitation, such a surface may be the lower mirror 1810 that is depicted in FIG. 19. The finished optical component would include the low-weight aerogel backing that accommodates the reflective surface 1810.

Figure 22:
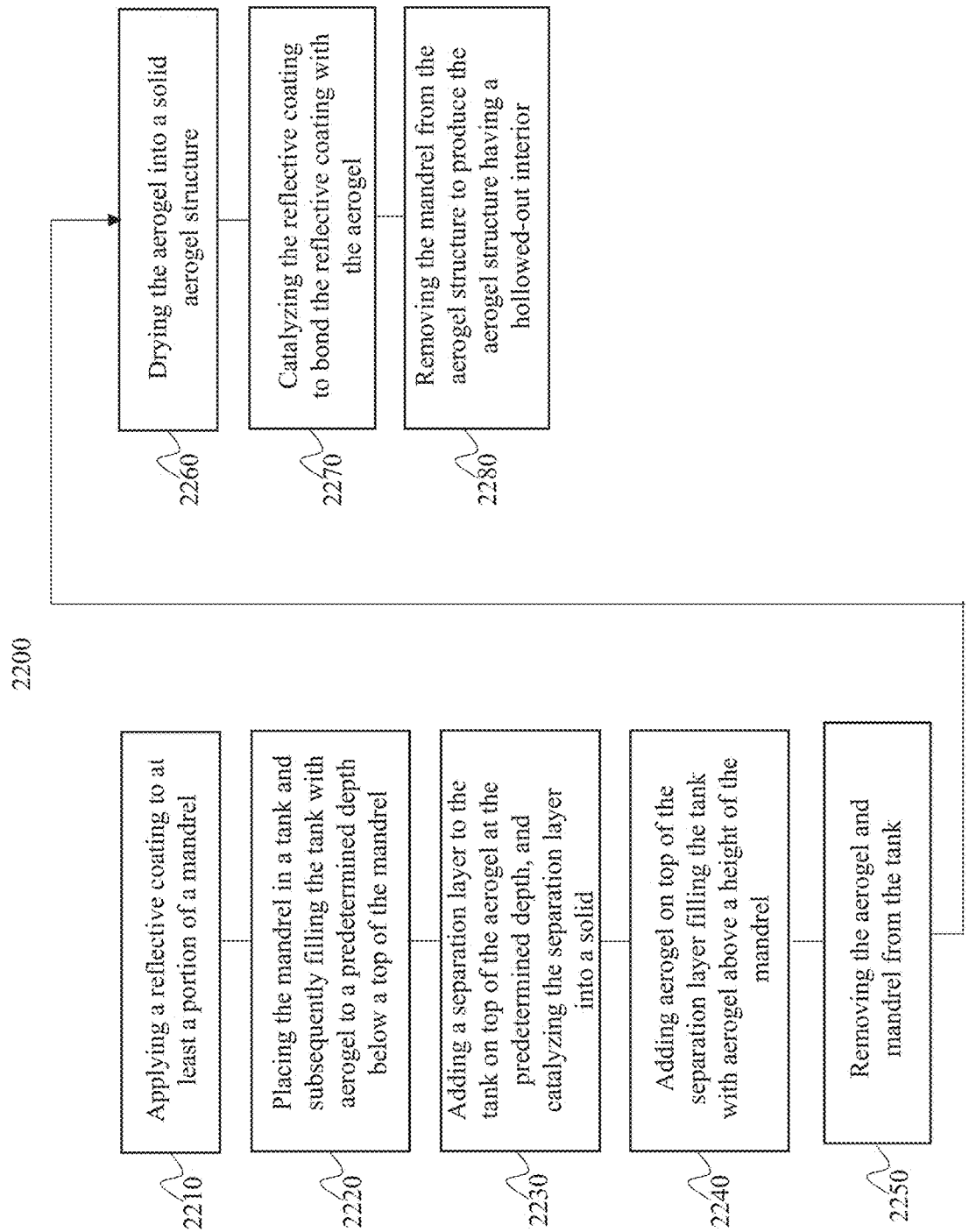
FIG. 22 depicts a process, in accordance with some example embodiments.

FIG. 22 depicts a method 2200 of manufacturing an optical system, in accordance with some example embodiments. At 2210, the method includes applying a reflective coating to a mandrel. At 2220, the method includes placing the mandrel in a tank and subsequently filling the tank with aerogel to a predetermined depth below a top of the mandrel. At 2230, the method includes adding a separation layer to the tank on top of the aerogel at the predetermined depth and catalyzing the separation layer into a solid. At 2240, the method includes adding aerogel on top of the separation layer filling the tank with aerogel above a height of the mandrel. At 2250, the method includes removing the aerogel and mandrel from the tank. At 2260, the method includes drying the aerogel into a solid aerogel structure. At 2270, the method includes catalyzing the reflective coating to bond the reflective coating with the aerogel. At 2280, the method includes removing the mandrel from the aerogel structure.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Only a few implementations and examples are described and other implementations, enhancements and variations can be made based on what is described and illustrated in this patent document. Moreover, the separation of various system components in the embodiments described in this patent document should not be understood as requiring such separation in all embodiments.

What is claimed is:

1. A method of manufacturing an optical system, the method comprising:
   applying a reflective coating to at least a portion of a surface of a mandrel;
   placing the mandrel in a tank and subsequently filling the tank with aerogel to a predetermined depth below a top of the mandrel;
   adding a separation layer to the tank on top of the aerogel at the predetermined depth, and catalyzing the separation layer into a solid;
   adding aerogel on top of the separation layer filling the tank with aerogel above a height of the mandrel;
   removing the aerogel and mandrel from the tank;
   drying the aerogel into a solid aerogel structure;
   catalyzing the reflective coating to bond the reflective coating with the aerogel; and
   removing the mandrel from the solid aerogel structure to produce a hollowed-out aerogel structure.

2. The method of claim 1, wherein the removing the mandrel comprises:
   separating a top portion of the solid aerogel structure from a bottom portion of the solid aerogel structure; and
   bonding together the top portion of the solid aerogel structure to the bottom portion of the solid aerogel structure after the mandrel has been removed.

3. The method of claim 1, further comprising:
   applying a lifting layer before applying the reflective coating.

4. The method of claim 1, further comprising:
   applying an aerogel bonding layer to the reflective coating after applying the reflective coating and before submerging the mandrel.

5. The method of claim 4, wherein the aerogel bonding layer is cured by heating the aerogel and the reflective coating.

6. The method of claim 1, further comprising:
   cutting holes in one or both of a top portion or a bottom portion of the solid aerogel structure to provide an unobstructed path for light to reach into or exit the optical system.

7. The method of claim 2, further comprising:
   providing a protective structure abound one or both of the bonded top or bottom portions.

8. The method of claim 1, further comprising:
   etching the separation layer using an etchant.

9. The method of claim 8, wherein the etchant is aqua regia.

10. The method of claim 8, wherein the reflective coating is applied to two or more surfaces of the mandrel.

11. The method of claim 1, wherein the separation layer floats on top of the aerogel.

12. The method of claim 1, wherein the drying the aerogel is supercritically drying the aerogel.

13. The method of claim 1, wherein the tank includes a support structure to mechanically support the mandrel in the tank.

14. The method of claim 1, wherein the aerogel is tetraethyl orthosilicate.

15. The method of claim 1, wherein the aerogel is a silica aerogel.

16. The method of claim 1, wherein the reflective coating is applied to two surfaces of the mandrel to produce two mirrors in the solid aerogel structure.

17. The method of claim 1, wherein the reflective coating is applied to one surface of the mandrel to produce one mirror in the solid aerogel structure.

* * * * *